United States Patent
Chernobilsky

(10) Patent No.: US 11,009,003 B2
(45) Date of Patent: May 18, 2021

(54) HUB AND SPINNER FOR A WIND TURBINE

(71) Applicant: Siemens Gamesa Renewable Energy A/S, Brande (DK)

(72) Inventor: Nicolas Chernobilsky, Vejle (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 39 days.

(21) Appl. No.: 16/126,170

(22) Filed: Sep. 10, 2018

(65) Prior Publication Data
US 2019/0078551 A1   Mar. 14, 2019

(30) Foreign Application Priority Data
Sep. 11, 2017   (EP) ..................................... 17190288

(51) Int. Cl.
*F03D 80/50* (2016.01)
*F03D 1/06* (2006.01)

(52) U.S. Cl.
CPC ........... *F03D 1/0691* (2013.01); *F03D 80/50* (2016.05); *F05B 2240/221* (2013.01)

(58) Field of Classification Search
CPC ........ F03D 1/0691; F03D 80/50; F03D 80/00; F05B 2240/221
See application file for complete search history.

(56) References Cited

U.S. PATENT DOCUMENTS

| | | | | |
|---|---|---|---|---|
| 2010/0129216 A1* | 5/2010 | Bagepalli | ............... | F03D 80/50 416/61 |
| 2012/0201693 A1* | 8/2012 | Pettersson | ............. | F03D 1/0658 416/244 R |
| 2013/0302175 A1* | 11/2013 | Munk-Hansen | ........ | F03D 80/00 416/245 R |
| 2014/0050591 A1* | 2/2014 | Munk-Hansen | ........ | F03D 80/50 416/244 R |
| 2015/0354233 A1* | 12/2015 | Ebbesen | ............... | F03D 1/0691 182/222 |
| 2017/0247945 A1 | 8/2017 | Wang et al. | | |

FOREIGN PATENT DOCUMENTS

| | | |
|---|---|---|
| CN | 203129943 U | 8/2013 |
| EP | 2192297 A2 | 6/2010 |
| EP | 2662559 A1 | 11/2013 |
| EP | 3139033 A1 | 3/2017 |
| KR | 20140037469 A | 3/2014 |
| WO | WO 2014108216 A1 | 7/2014 |

* cited by examiner

*Primary Examiner* — Aaron R Eastman
(74) *Attorney, Agent, or Firm* — Schmeiser, Olsen & Watts LLP

(57) ABSTRACT

A hub for a wind turbine is longitudinally extended along a longitudinal axis between a front tip and a rear shaft flange is provided. The hub comprises: at least one blade flange for connecting a respective blade to the hub, at least one top edge on an external surface of the hub, the top edge being positioned with respect to a vertical direction over the front tip, when the hub is positioned in a service position, a plurality of service steps, each step) being oriented for permitting an individual to move between the front tip and the top edge or between the rear shaft flange and the top edge when the hub is positioned around the longitudinal axis in the service position.

9 Claims, 5 Drawing Sheets

HUB AND SPINNER FOR A WIND TURBINE

CROSS-REFERENCE TO RELATED APPLICATIONS

This application claims priority to European application No. EP17190288.5 having a filing date of Sep. 11, 2017, the entire contents of both of which are hereby incorporated by reference.

FIELD OF TECHNOLOGY

The following relates to a hub for a wind turbine. Further, embodiments of the present invention relate to a hub and spinner assembly for a wind turbine.

BACKGROUND

In the technical field of wind turbines, components are getting larger and larger. In particular, this is true for the main shaft of the wind turbine and consequently for the hub attached thereto.

Service tasks have to be performed in the area between the hub and the spinner, such as blade bearing connection, hub connection or exchange of the blade bearing outer sealing. For this, service technicians have to be situated in the area between spinner and machined hub. Due to the large size of some hubs technicians have difficulties in reaching areas of the hub or of the spinner involved with the above defined service task.

Therefore, there is a need, in wind turbines, to provide an improved design for an hub and for an assembly of hub and spinner, which provide easy accessibility for an individual to all the parts of the hub and spinner of interest, in particular for executing service tasks.

SUMMARY

This need may be met by the subject matter according to the independent claim. Advantageous embodiments of the present invention are described by the dependent claims.

According to a first aspect of embodiments of the present invention, it is provided a hub for a wind turbine, the hub being longitudinally extended along a longitudinal axis between a front tip and a rear shaft flange connectable to a rotational shaft of the wind turbine, the hub comprising:
at least one blade flange distributed around the longitudinal axis for connecting a respective blade to the hub,
at least one top edge on an external surface of the hub, the top edge being positioned with respect to a vertical direction over the front tip, when the hub is positioned around the longitudinal axis in at least a service position,
a plurality of service step, each step being oriented for permitting an individual to move between the front tip and the top edge or between the rear shaft flange and the top edge when the hub is positioned around the longitudinal axis in at least a service position.

The hub may comprise a plurality of blade flanges distributed around the longitudinal axis, each top edge is defined as the line of minimal distance between two adjacent blade flanges.

Particularly, but not exclusively in the respective service position a flange axis of one of the blade flanges is vertically oriented and pointing downwards.

According to a second aspect of embodiments of the present invention, it is provided a wind turbine including the hub above described and a spinner, a service space being defined between the hub and spinner for hosting at least an individual.

Advantageously, in the service position of the hub, an individual, such as a technician, can enter an inner volume of the hub, coming from the hollow shaft connected to rear shaft flange of the hub. From the inner volume of the hub, the individual may reach the external surface of the hub, for example through a manhole provided on the front tip of the hub. From the front tip the individual may reach one of the top edges, in particular the top edge positioned over the front tip, through the plurality of service step. From such top edge the individual may descend towards the rear shaft flange, using the steps provided between such top edge and the rear shaft flange. From the rear shaft flange, using the same steps, the individual may again reach the top edge and then descend the hub up to the front tip. The individual may leave the hub through a manhole on the hub, in particular a man hole on the front tip, reaching the inner volume of the hub and the hollow shaft through the rear shaft flange.

The individual may also reach an outer surface of the spinner through at least a spinner manhole for allowing the passage between the hub and the outer surface of the spinner.

According to embodiments of the invention, the hub further comprises at least a service stair including a portion of plurality of service steps.

The service steps and/or of the service stair may be adjacent to at least one of the blade flanges.

According to another embodiment of the invention, the service steps and/or of the service stair may be aligned with a flange axis of a blade flange, i.e. vertically oriented, when such axis of a blade flange is also vertically oriented.

According to another embodiment of the invention, the hub further comprises at least a landing surface between the front tip and a respective top edge, the landing surface being so oriented that when the hub is in at least a respective service position the individual can be supported by the landing surface. The landing service provides an intermediate rest between the front tip of the hub and the top edge.

A secondary service stair may be provided between the front tip manhole (and the landing surface.

A landing manhole may be provided on the landing surface and is usable as a passage for an individual between the secondary service stair and the landing surface.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which embodiments of the invention are not limited.

BRIEF DESCRIPTION

Some of the embodiments will be described in detail, with reference to the following figures, wherein like designations denote like members, wherein FIG. 1 shows a front axonometric view of a partial representation of a wind turbine comprising a hub;

DETAILED DESCRIPTION

Figure 1:
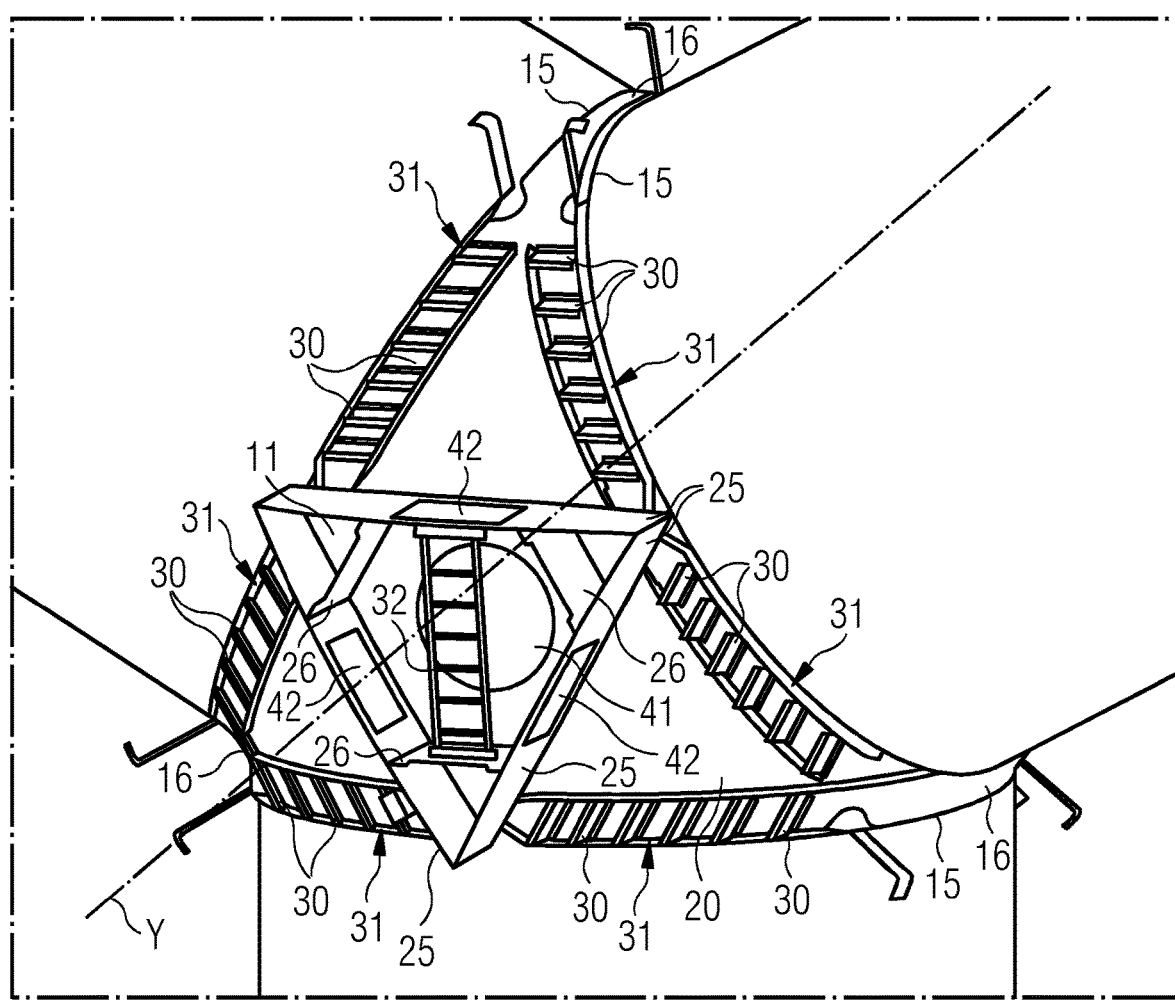
Figure 2:
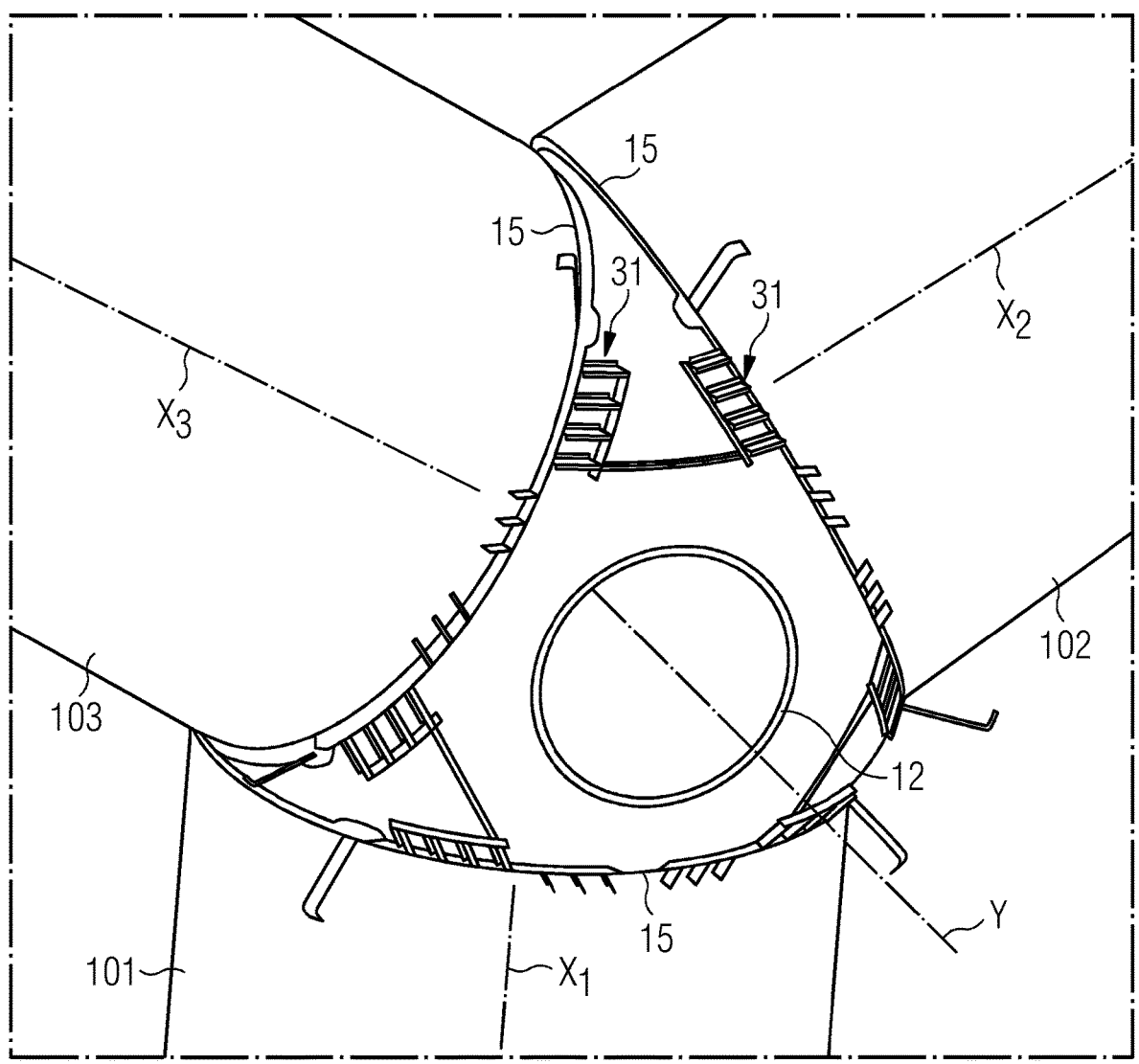
FIG. 2 shows a rear axonometric view of a partial representation of the wind turbine of FIG. 1.
Figure 3:
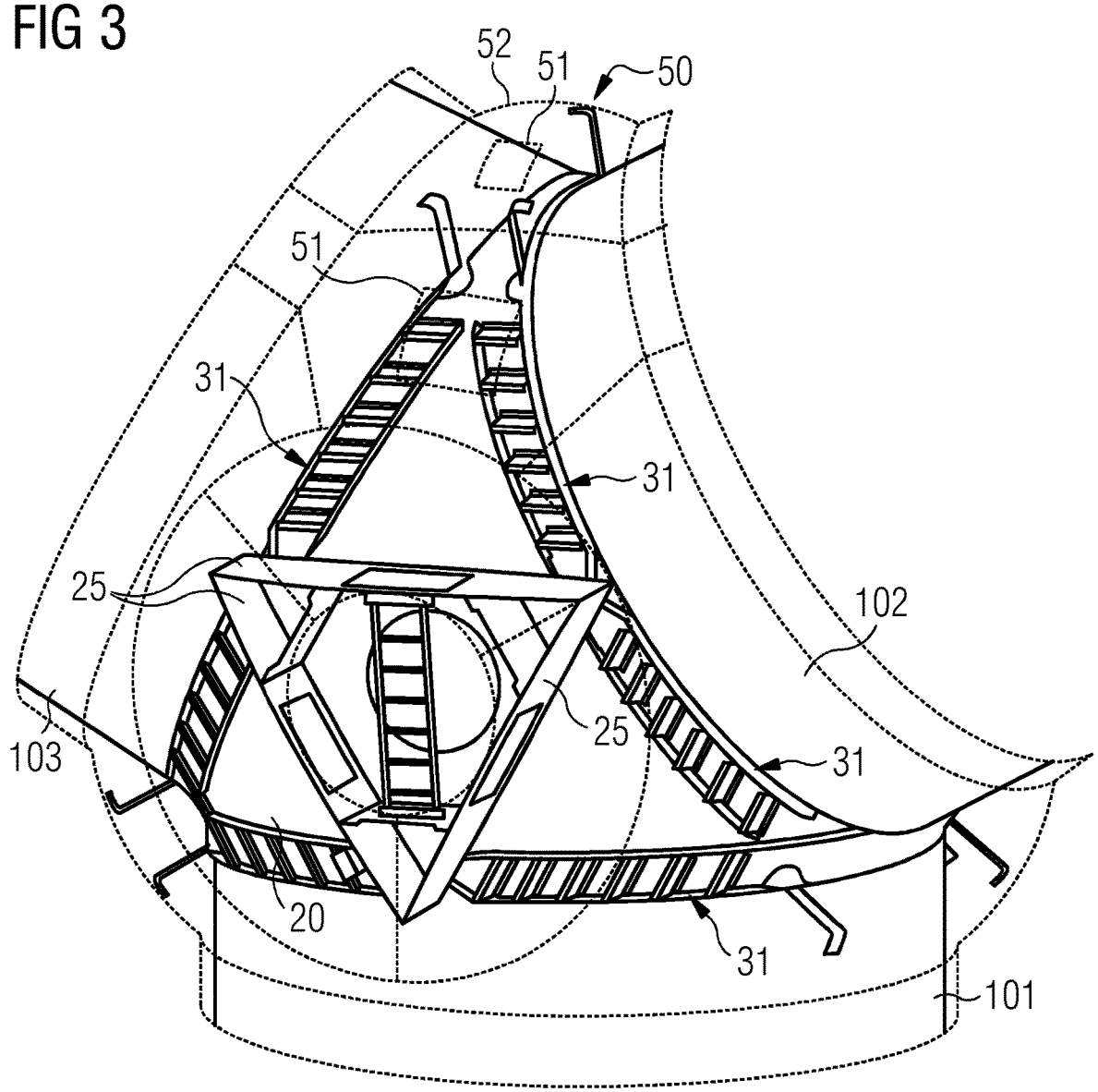
FIG. 3 shows a front axonometric view of a partial representation of a wind turbine comprising a hub and a spinner.
Figure 4:
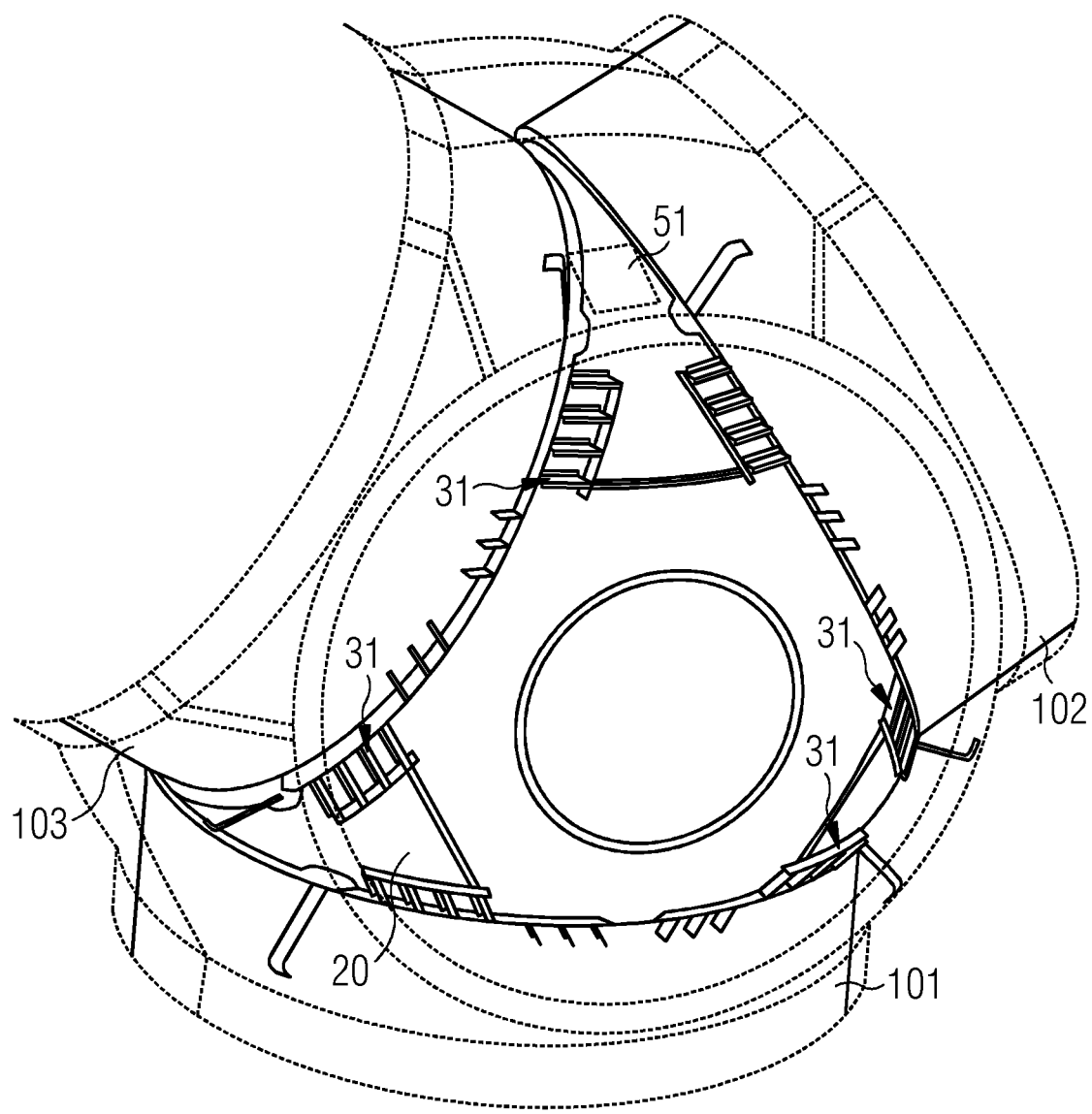
FIG. 4 shows a rear axonometric view of a partial representation of the wind turbine of FIG. 3.

The illustrations in the drawings are schematic. It is noted that in different figures, similar or identical elements are provided with the same reference signs.

FIGS. 1 to 4 shows a partial representation of wind turbine 100, including a hub 10 according to embodiments of the invention and three blades 101, 102, 103 attached to the hub 10.

The hub 10 longitudinally extends along a longitudinal axis Y between a front tip 11 and a rear shaft circular flange 12 connectable to a hollow rotational shaft (not represented) of the wind turbine 100.

The longitudinal axis Y may be particularly coincident with the axis of the rotational shaft of the wind turbine 100, being therefore coincident with the axis of rotation of the turbine rotor.

When not differently specified, the terms axial or longitudinal, radial and circumferential in the following are made with reference to the longitudinally axis Y. Therefore, the blades 101, 102, 103 extend radially with respect to the rotational axis Y.

The hub 10 is hollow comprising an external surface 20 and an inner volume accessible through the rear shaft circular flange 12. A front tip manhole 41 is provided on the front tip 11. The front tip manhole 41 is usable as a passage for an individual, for example a service technician, between an inner volume of the hub 10 and the external surface 20.

The hub 10 comprises at least one blade flange 15 for connecting a respective blade to the hub 10. In the example of the attached figures three blade circular flanges 15 each for attaching a respective blade 101, 102, 103 to the hub 10. A pitch bearing (not part of embodiments of the present invention and therefore not described in further detail) may be interposed between each blade flange 15 and the respective blade 101, 102, 103. The three blade circular flanges 15 are regularly distributed around the longitudinal axis Y, i.e. when considering the flange axes X1, X2, X3 of the circular flanges 15, the circumferential angles between each couple of consecutive flange axes X1, X2; X2, X3 and X3, X1 have the same value (120 degrees). The flange axes X1, X2, X3 identifies an intermediate plane of the hub 10, transversal to the longitudinally axis Y. The hub is constituted by a front part (FIGS. 1 and 3), longitudinally extending between front tip 11 and the intermediate plane X1, X2, X3, and a rear (FIGS. 3 and 4), longitudinally extending between the intermediate plane X1, X2, X3 and the rear shaft circular flange 12.

In general, embodiments of the present invention are independent from the number of blade flange 15. According to other respective embodiments (not represented in the attached figures) may have for example only one blade or two blades or four or more blades.

The hub 10 further comprises at least one top edge 16 on the external surface 20 of the hub 10. The top edge 16 is positioned with respect to a vertical direction over the front tip 11 when the hub 10 is positioned around the longitudinal axis Y in at least a service position. A typical service position for a wind turbine 100 having three blades 101, 102, 103 is shown in the attached FIGS. 1 to 4, i.e. with one of the flange axes X1, X2, X3 vertically oriented or almost vertically oriented.

When the hub 10 comprises a plurality of blade flanges 15, like in the embodiment of the attached figures, each top edge 16 is defined as the line of minimal distance between two adjacent blade flanges 15. Depending on the shape of the hub 10 and in particular of the external surface 20, the top edge 16 may lie on the intermediate plane X1, X2, X3 or in proximity to the intermediate plane X1, X2, X3.

The hub 10 further comprises on the external surfaces 20 a plurality of service steps 30. The plurality of service step 30 may be provided on the front part, on the rear part or on both. Each step 30 is oriented for permitting an individual, for example a service technician, to move between the front tip 11 and the top edge 16 or between the rear shaft flange 12 and the top edge 16, when the hub 10 is positioned in the service position.

The service steps 30 are arranged into service stair 31, each including a portion of the plurality of service steps 30.

In the embodiment of the attached FIGS. 1 to 4, the service stairs 31 are adjacent to the blade flanges 15.

When the hub 10 is positioned in the service position with the flange axis X1 of the blade 101 oriented according the vertical direction, a service technician may reach the top edge 16 comprised between the blade flanges 15 of the other two blades 102, 103, by using two stairs 31 respectively adjacent to the blade flanges 15 of the other two blades 102, 103. In the embodiment of the attached FIGS. 1 to 4, the service stairs 31 are constituted by metal or composite steps 30.

Figure 5:
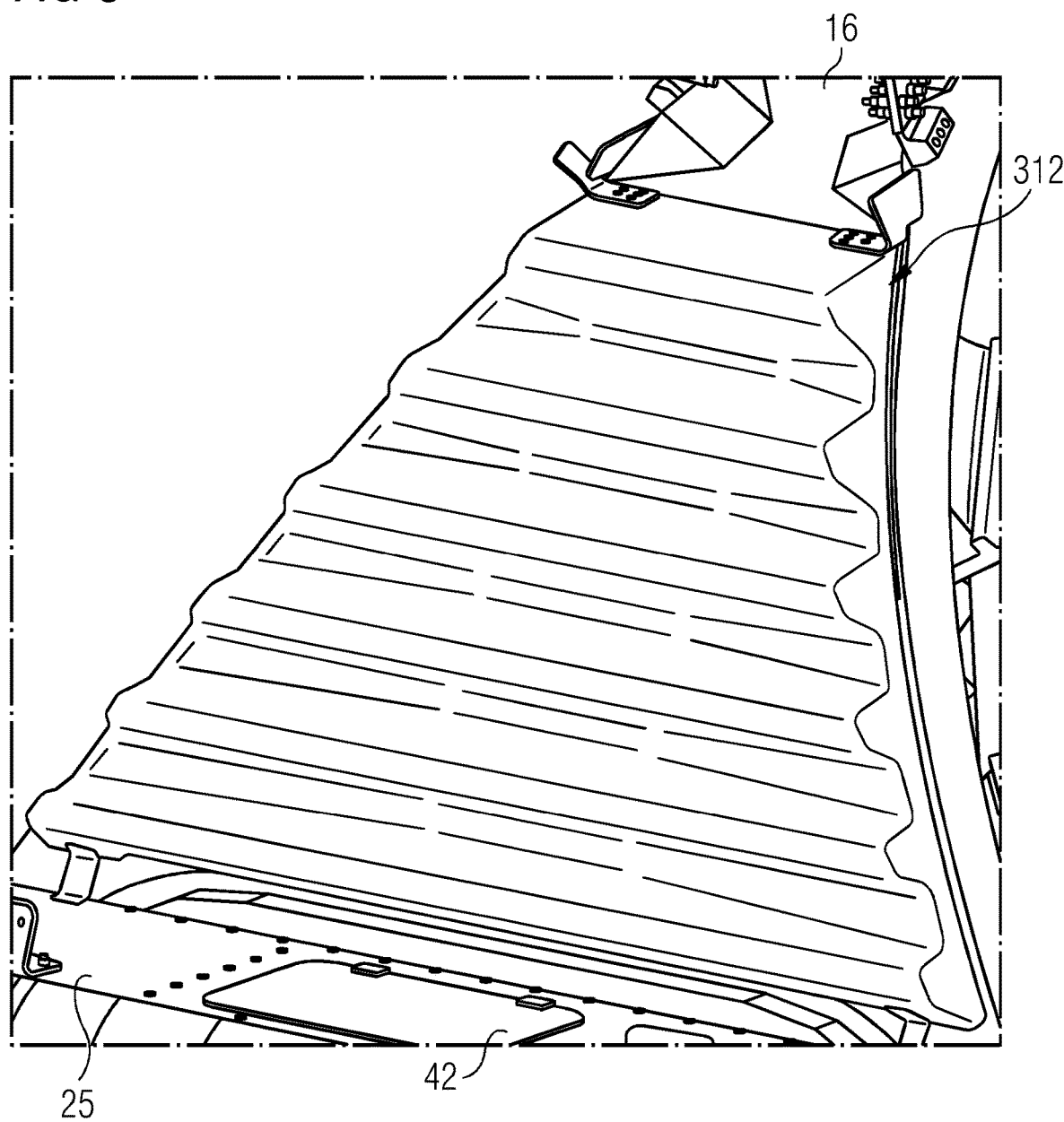
FIG. 5 shows a partial axonometric view of a variant embodiment of a hub.

In the alternative embodiment of the attached FIG. 5, a service stair 31a 312 is aligned with the flange axis X1 of the blade 101, i.e. permitting a service technician to reach the top edge 16 comprised between the blade flanges 15 of the other two blades 102, 103 by moving according to a direction parallel to the flange axis X1. In such embodiment the service stair 31a is manufactured as a single element in composite material.

On the front part of the hub 10, around the front tip, the hub 10 further comprises three landing surfaces 25, disposed with respect to one another to form a triangle in a frontal view orthogonal to the longitudinal axis Y. Each landing surface 25 is provided on a respective planar plate positioned between the front tip 11 and a respective top edge 16. Each landing surface 25 is so oriented that when the hub 10 is in a respective service position an individual can be supported by the landing surface 25. In particular, each landing surface 25 is so oriented that when the hub 10 is in a respective service position the landing surface 25 is horizontally oriented. A respective landing manhole 42 is provided on each of the planar plate comprising the landing surface 25. The landing manhole 42 is usable as a passage for an individual between the front tip 11, in particular between the front tip manhole 41 and the landing surface 25. A secondary service stair 32 is provided between the front tip manhole 41 and the landing surface 25, for permitting an individual, in particular a service technician to move between the front tip manhole 41 and the landing surface 25.

Three auxiliary support surfaces 26 are provided on the front part of the hub 10 for supporting the secondary service stair 32. Each auxiliary support surfaces 26 is parallel to a respective landing surface 25 and disposed in such a way that the front tip manhole 41 is intermediate between each respective pair of parallel landing surface 25 and auxiliary support surfaces 26. The secondary service stair 32 is movable and may be used to connect each respective pair of parallel landing surface 25 and auxiliary support surfaces 26, in order to be always oriented along one of the flange axis X1, X2, X3, depending from the service position of the hub 10. In the embodiment of the attached FIGS. 1 to 4, the secondary service stair 32 is oriented along the flange axis X1, i.e. both the secondary service stair 32 and the flange axis X1 are oriented along a vertical direction.

The wind turbine 100 further includes a spinner 50. A service space is defined between the hub 10 and spinner 50 for hosting an individual, in particular a service technician.

The spinner 50 comprises a plurality of spinner manholes 51 for allowing a passage between the hub 10 and an outer surface 52 of the spinner 50. A spinner manhole 51 may be provided over one top edge 16 for permitting a service technician to reach an outer surface 52 of the spinner 50 between two blades.

The invention claimed is:

1. A hub for a wind turbine, the hub being longitudinally extended along a longitudinal axis between a front tip and a rear shaft flange connectable to a rotational shaft of the wind turbine, the hub comprising:
   three blade flanges for connecting a respective first blade, second blade, and third blade to the hub,
   at least one top edge on an external surface of the hub, the top edge being positioned with respect to a vertical direction over the front tip, when the hub is positioned around the longitudinal axis in at least a service position, wherein in the service position, a flange axis of at least one blade flange of the three blade flanges is vertically oriented and pointing downwards,
   a first service stair adjacent to a first blade flange of the three blade flanges, a second service stair adjacent to a second blade flange of the three blade flanges, and a third service stair adjacent to a third blade flange of the three blade flanges, each of the first service stair, second service stair, and third service stair including a plurality of service steps, each step being oriented for permitting an individual to move between the front tip and the top edge or between the rear shaft flange and the top edge when the hub is positioned around the longitudinal axis in the at least the service position,
   wherein when the hub is positioned in the service position, the top edge is reachable by two of the first service stair, second service stair, and third service stair that are respectively adjacent to the other two blade flanges of the three blade flanges.

2. The hub as claimed in claim 1, wherein each top edge is defined as the line of minimal distance between two adjacent blade flanges.

3. The hub as claimed in claim 1, wherein a front tip manhole is provided on the front tip and is usable as a passage for an individual between an inner volume of the hub and the external surface of the hub.

4. A wind turbine including the hub according to claim 1 and a spinner, a service space being defined between the hub and spinner for hosting at least an individual.

5. The wind turbine as claimed in claim 4, wherein the spinner comprises at least a spinner manhole for allowing a passage between the hub and an outer surface of the spinner.

6. A hub for a wind turbine, the hub being longitudinally extended along a longitudinal axis between a front tip and a rear shaft flange connectable to a rotational shaft of the wind turbine, the hub comprising:
   at least one blade flange for connecting a respective blade to the hub, at least one top edge on an external surface of the hub, the top edge being positioned with respect to a vertical direction over the front tip, when the hub is positioned around the longitudinal axis in at least a service position,
   a plurality of service steps on the external surface of the hub, each step being oriented for permitting an individual to move between the front tip and the top edge or between the rear shaft flange and the top edge when the hub is positioned around the longitudinal axis in at least a service position, and
   at least one landing surface between the front tip and a respective top edge, the landing surface being so oriented that when the hub is in the respective service position the individual can be supported by the landing surface, wherein when the landing surface is oriented to support the individual, wherein a second plurality of service steps of the plurality of service steps extend from the top of the landing surface attached in each orientation.

7. The hub as claimed in claim 6, wherein a secondary service stair is provided between the front tip manhole and a landing surface.

8. The hub as claimed in claim 7, wherein a landing manhole is provided on the landing surface and is usable as a passage for an individual between the secondary service stair and the landing surface.

9. The hub of claim 6, wherein the hub comprises three blade flanges for connecting respective blades to the hub, at least three landing surfaces, at least three auxiliary landing surfaces, and a movable secondary service stair, wherein each of the at least three landing surfaces is parallel to one of the at least three auxiliary landing surfaces, wherein when any of the at least three landing surfaces is oriented to support the individual, the secondary stair is moveable to connect such landing surface of the three landing surfaces to a parallel auxiliary landing surface of the at least three auxiliary landing surfaces.

* * * * *